(12) United States Patent
Kudo et al.

(10) Patent No.: US 11,703,233 B2
(45) Date of Patent: Jul. 18, 2023

(54) EQUIPMENT DETERMINATION METHOD OF COGENERATION SYSTEM, EQUIPMENT DETERMINATION DEVICE THEREOF, AND COMPUTER READABLE RECORDING MEDIUM THEREOF

(71) Applicant: Yazaki Energy System Corporation, Tokyo (JP)

(72) Inventors: Tomoharu Kudo, Hamamatsu (JP); Motomi Inagaki, Hamamatsu (JP); Yohsuke Yamada, Hamamatsu (JP)

(73) Assignee: YAZAKI ENERGY SYSTEM CORPORATION, Tokyo (JP)

( * ) Notice: Subject to any disclaimer, the term of this patent is extended or adjusted under 35 U.S.C. 154(b) by 293 days.

(21) Appl. No.: 17/203,956

(22) Filed: Mar. 17, 2021

(65) Prior Publication Data
US 2021/0302032 A1    Sep. 30, 2021

(30) Foreign Application Priority Data
Mar. 27, 2020 (JP) ................... 2020-056958

(51) Int. Cl.
| F24D 19/10 | (2006.01) |
|---|---|
| F28D 21/00 | (2006.01) |
| F24D 3/08 | (2006.01) |
| G05B 15/02 | (2006.01) |
| F02G 5/02 | (2006.01) |

(52) U.S. Cl.
CPC .......... *F24D 19/1081* (2013.01); *F02G 5/02* (2013.01); *F24D 3/08* (2013.01); *F28D 21/0001* (2013.01); *G05B 15/02* (2013.01); *F24D 2200/16* (2013.01); *F24D 2220/10* (2013.01)

(58) Field of Classification Search
CPC .... F24D 19/1081; F24D 3/08; F24D 2200/16; F24D 2220/10; F02G 5/02; F28D 21/0001; G05B 15/02; Y02E 20/14
See application file for complete search history.

(56) References Cited

U.S. PATENT DOCUMENTS

| 6,522,948 B1 * | 2/2003 | Benneweis .......... A01C 21/005 701/50 |
| 9,316,402 B2 * | 4/2016 | Noh .................... F24D 19/1081 |

(Continued)

FOREIGN PATENT DOCUMENTS

JP    4426860 B2    3/2010

*Primary Examiner* — Ramesh B Patel
(74) *Attorney, Agent, or Firm* — Sughrue Mion, PLLC

(57) ABSTRACT

An equipment determination method of a cogeneration system includes the steps of: calculating a total hot water supply load for each day over a predetermined period longer than a specific period based on each unit hot water supply load for hour according to hot water supply use by consumers; setting as a representative period a specific period on which the total hot water supply load becomes at least a low load among the calculated total hot water supply load for each day; determining a capacity of the cogeneration equipment based on the total hot water supply load on the set representative period; and determining a capacity of the plurality of hot water storage tanks based on an amount of hot water supply load exceeding the capacity of the determined cogeneration equipment among each unit hot water supply load for two or more divided periods including the set representative period.

7 Claims, 7 Drawing Sheets

(56) References Cited

U.S. PATENT DOCUMENTS

| | | | |
|---|---|---|---|
| 2007/0079769 A1* | 4/2007 | Ryoo | F24D 11/002 122/4 R |
| 2007/0295826 A1* | 12/2007 | Farrell | F24D 3/08 237/19 |
| 2011/0139184 A1* | 6/2011 | Cherukupalli | H02S 30/10 134/18 |
| 2015/0053150 A1* | 2/2015 | Hiwatari | F24D 17/001 122/13.01 |
| 2017/0102286 A1* | 4/2017 | Inoue | G01N 29/14 |
| 2018/0137696 A1* | 5/2018 | Takano | G07C 5/0825 |
| 2018/0229379 A1* | 8/2018 | Naito | B25J 9/1676 |
| 2019/0162477 A1* | 5/2019 | Matsukiyo | F28D 1/0477 |
| 2019/0316811 A1* | 10/2019 | Nakamura | F24S 10/70 |
| 2021/0148617 A1* | 5/2021 | Hiyama | F25B 41/20 |
| 2021/0150641 A1* | 5/2021 | Yamada | G06Q 50/06 |
| 2021/0302032 A1* | 9/2021 | Kudo | F24D 3/08 |

\* cited by examiner

EQUIPMENT DETERMINATION METHOD OF COGENERATION SYSTEM, EQUIPMENT DETERMINATION DEVICE THEREOF, AND COMPUTER READABLE RECORDING MEDIUM THEREOF

CROSS-REFERENCE TO RELATED APPLICATIONS

This application is based on and claims priority under 35 USC 119 from Japanese Patent Application No. 2020-056958 filed on Mar. 27, 2020, the contents of which are incorporated herein by reference.

TECHNICAL FIELD

The present invention relates to an equipment determination method of a cogeneration system, an equipment determination device thereof, and a computer readable recording medium thereof.

BACKGROUND ART

In the related art, there has been known a cogeneration system using waste heat of a fuel cell, a gas engine, or the like for hot water supply (see Patent Literature 1). Some of such cogeneration systems are applied to a housing complex, a long-term care facility, a hospital, and the like.

CITATION LIST

Patent Literature

Patent Literature 1: Japanese Patent No. 4426860

SUMMARY OF INVENTION

Here, a cogeneration system used in a housing complex or the like includes a cogeneration equipment that generates electric power from a fuel cell, a gas engine, or the like and discharges heat, and a buffer tank that heats water using waste heat from the cogeneration equipment, and is configured to supply water from the buffer tank to a hot water storage tank of each household or the like and exchange heat with stored hot water or water in the hot water storage tank.

Such a cogeneration system is required to have high power generation efficiency and high waste heat utilization efficiency. Therefore, from the viewpoint of realizing high power generation efficiency, it is desirable that the cogeneration equipment performs a full load operation of a base load without performing a partial load operation. Further, some cogeneration equipment have a long start-up time when temporarily stopped, it is not possible to easily repeat stop and start-up, and an operation for 24 hours and 365 days is a standard.

Therefore, it is desirable to make good use of waste heat while base-load operating the cogeneration equipment at a full load for 24 hours and 365 days, for example, but the heat must be wasted by a radiator when a heat load for using waste heat is absent. For this reason, a heat storage tank or a hot water storage tank may be provided so as to avoid wasting heat, but efficiency of an entire system is reduced when a capacity is not appropriate for the cogeneration equipment.

Also, this problem is not limited to a cogeneration equipment that performs a base load operation at a full load for 24 hours and 365 days, but is also common to, for example, a cogeneration equipment that cannot be stopped as much as possible or that does not perform a partial load operation as much as possible. Therefore, this problem is a common problem in a cogeneration equipment which is stopped for a few days out of 365 days, or for a few hours out of 24 hours.

The present invention has been made so as to solve such problems in the related art, and an object of the present invention is to provide an equipment determination method of cogeneration system, an equipment determination device thereof, and a computer readable recording medium thereof capable of preventing a decrease in efficiency of an entire system.

In the present invention, based on each unit hot water supply load for two or more divided periods according to hot water supply use by a plurality of consumers, a total hot water supply load for each specific period including the two or more divided periods is calculated over a predetermined period longer than the specific period, a specific period on which the total hot water supply load is at least on a low load side of the calculated total hot water supply load for each specific period is set as a representative, a capacity of a cogeneration equipment is determined based on the total hot water supply load on the set representative period, and a capacity of a plurality of hot water storage tanks is determined based on an amount of hot water supply load exceeding the determined capacity of the cogeneration equipment among each unit hot water supply load for the two or more divided periods constituting the set representative period.

According to the present invention, it is possible to prevent a decrease in efficiency of an entire system.

DESCRIPTION OF EMBODIMENTS

Hereinafter, the present invention will be described according to a preferred embodiment, and a cogeneration system will be described prior to the embodiment.

The present invention is not limited to the following embodiment, and can be modified as appropriate without departing from the scope of the present invention. Although a part of configurations may not be illustrated or described in the embodiments to be described below, it goes without saying that a known or well-known technique is appropriately applied to details of an omitted technique within a range in which no contradiction occurs to contents to be described below.

Figure 1:
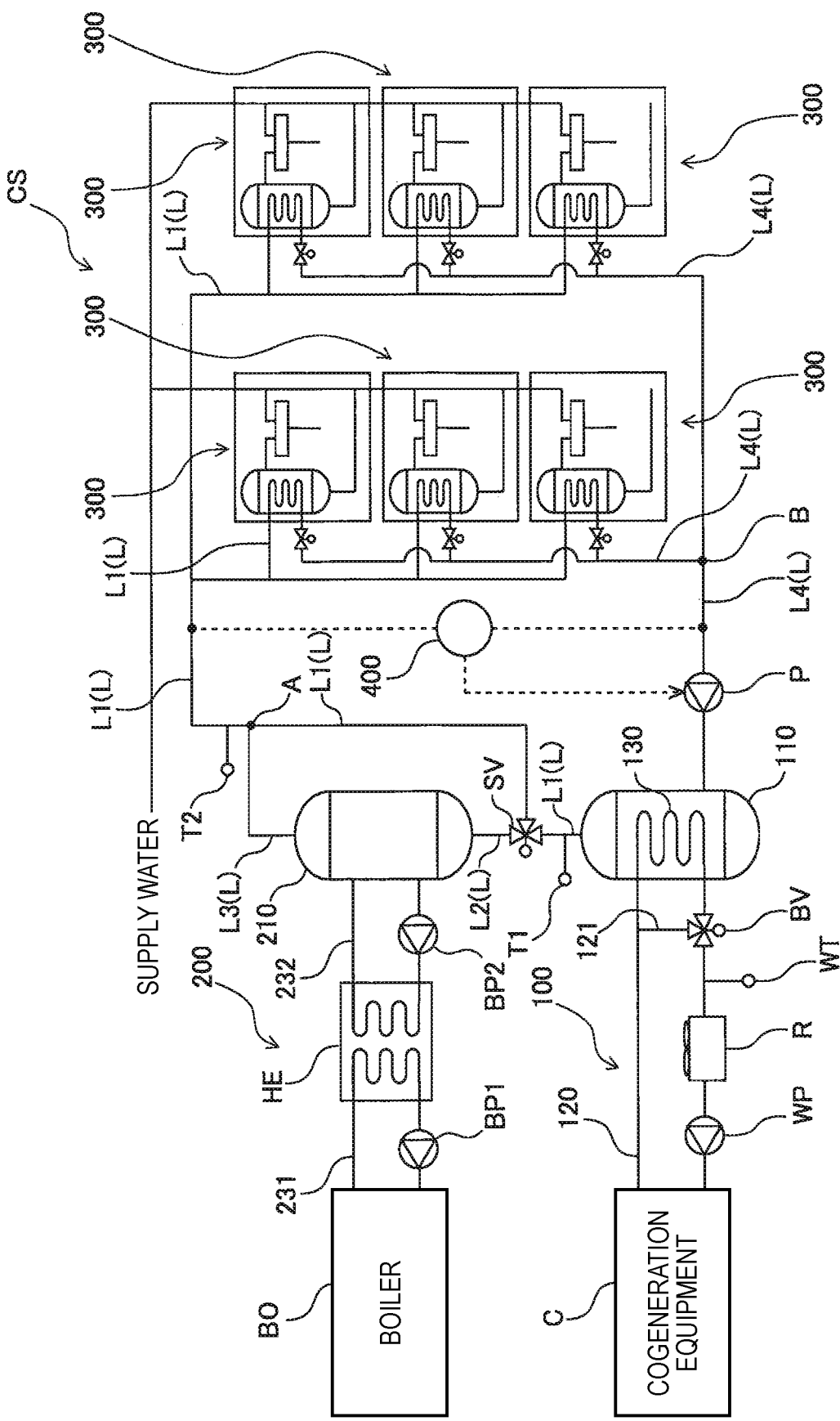
FIG. 1 is a configuration diagram showing an example of a cogeneration system.
Figure 2:
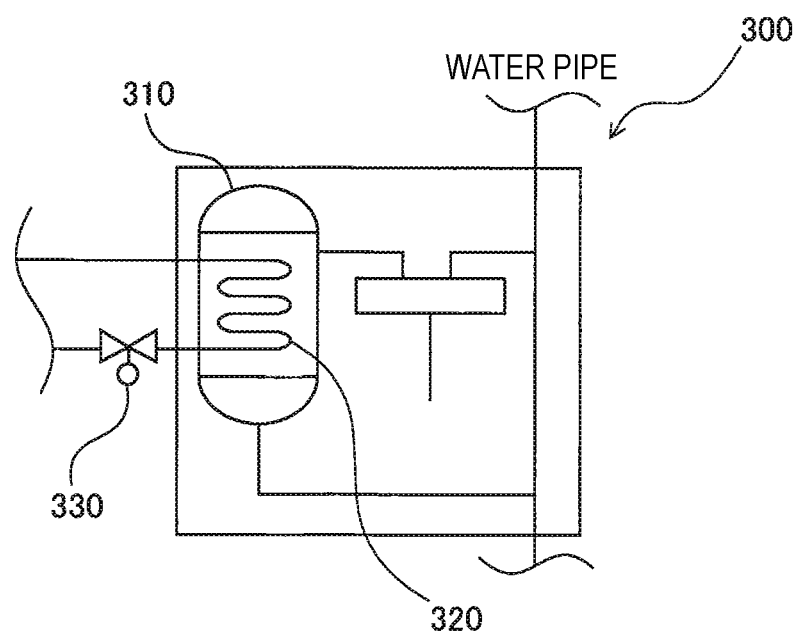
FIG. 2 is a partial configuration diagram of the cogeneration system shown in FIG. 1.

FIG. 1 is a configuration diagram showing an example of the cogeneration system, and FIG. 2 is a partial configuration diagram of the cogeneration system shown in FIG. 1.

A cogeneration system CS shown in FIG. 1 includes a first equipment 100 including a cogeneration equipment C, a second equipment 200 including a boiler BO, a plurality of consumer side equipment 300, a supply path L, a differential pressure measurement unit 400, a circulation pump P, first and second temperature sensors T1, T2, and a motor operated valve SV. The cogeneration system CS supplies a heat medium (which may be an antifreezing fluid although hot water is assumed) obtained from the first and second equipment 100, 200 to a hot water storage tank 310 (see FIG. 2) of each consumer in the consumer side equipment 300 through the supply path L.

The first equipment 100 includes the cogeneration equipment C, a buffer tank 110, a connection pipe 120, a heat exchanger (heater) 130, a bypass motor operated valve BV, a radiator R, a waste heat circulation pump WP, and a waste heat temperature sensor WT.

The cogeneration equipment C is a device such as a fuel cell or a gas engine that generates electric power and discharges heat. The buffer tank 110 incorporates the heat exchanger 130 that heats the heat medium by using waste heat obtained by the cogeneration equipment C (for example, heat generated in a process of producing electricity for a fuel cell, cooling water heated by being used for cooling a gas engine, or exhaust gas from a gas engine).

The connection pipe 120 is a pipe that connects the cogeneration equipment C and the buffer tank 110. In FIG. 1, the cogeneration equipment C is assumed to be a fuel cell. For this reason, the connection pipe 120 is illustrated as a pipe that circulates cooling water from the cogeneration equipment C to the buffer tank 110 and from the buffer tank 110 to the cogeneration equipment C.

The connection pipe 120 is connected to the heat exchanger 130 in the buffer tank 110. The cooling water discharged from the cogeneration equipment C flows into the heat exchanger 130, and heats the heat medium in the buffer tank 110 through heat exchange in the heat exchanger 130.

The connection pipe 120 includes a bypass pipe 121. The bypass pipe 121 bypasses the buffer tank 110 (heat exchanger 130), and is a pipe that returns the cooling water discharged from the cogeneration equipment C to the cogeneration equipment C without being introduced into the buffer tank 110.

The bypass motor operated valve BV is provided in the bypass pipe 121. An opening degree of the bypass motor operated valve BV is adjusted so that a temperature of the cooling water returned to the cogeneration equipment C does not become equal to or lower than a predetermined temperature, and the bypass motor operated valve BV is opened when there is no need to heat the heat medium in the buffer tank 110, so that an entire amount or a small amount of the cooling water is made to bypass without passing through the buffer tank 110 (heat exchanger 130).

The waste heat temperature sensor WT detects the temperature of the cooling water (cooling water whose temperature has decreased due to heating of the heat medium in the buffer tank 110 when not passing through the bypass pipe 121) heated by the waste heat.

The radiator R functions to cool the cooling water when the waste temperature of the cooling water is too high. The waste heat circulation pump WP serves as a power source for circulating the cooling water between the cogeneration equipment C and the buffer tank 110.

The second equipment 200 includes the boiler BO, a buffer tank 210, a heat exchanger HE, connection pipes 231, 232, and boiler circulation pumps BP1, BP2.

The boiler BO makes fuel to burn, and heats water and the like by thermal energy thereof. The heat exchanger HE heats the heat medium using water or the like from the boiler BO. The buffer tank 210 stores the heat medium heated by the heat exchanger HE.

The first connection pipe 231 is a pipe that connects the boiler BO and the heat exchanger HE. The second connection pipe 232 is a pipe that connects the heat exchanger HE and the buffer tank 210. The first boiler circulation pump BP1 serves as a power source for circulating water and the like between the boiler BO and the heat exchanger HE. The second boiler circulation pump BP2 serves as a power source for circulating the heat medium between the heat exchanger HE and the buffer tank 210.

The plurality of consumer side equipment 300 are facilities provided for each consumer. As shown in FIG. 2, the consumer side equipment 300 includes a hot water storage tank 310, a heat exchanger 320, and a two-way valve 330.

The hot water storage tank 310 is provided for each consumer and stores hot water therein. The heat exchanger 320 introduces the heat medium from a first path L1 to be described later, heats water in the hot water storage tank 310, and discharges water to a fourth path L4 to be described later. The two-way valve 330 is, for example, a valve body provided on the fourth path L4 to be described later. By controlling the opening degree of the two-way valve 330, an introduction amount of the heat medium into the heat exchanger 320 is controlled. In the consumer side equipment 300, hot water stored in the hot water storage tank 310 is mixed with cold water supplied from a water pipe or the like to have an appropriate temperature, and then the mixed water is supplied from a faucet or the like to a consumer side.

The supply path L includes first to fourth paths L1 to L4. The first path L1 is a pipe that connects the buffer tank 110 of the first equipment 100 to the hot water storage tank 310 of each of the plurality of consumer side equipment 300. The heat medium in the buffer tank 110 is supplied to each of the hot water storage tanks 310 through the first path L1.

The second path L2 is a pipe that connects an intermediate position of the first path L1 to the buffer tank 210 of the second equipment 200. Therefore, the heat medium in the buffer tank 110 of the first equipment 100 can also be supplied to the buffer tank 210 of the second equipment 200. The motor operated valve SV is provided at the intermediate position described above. By the control of the motor operated valve SV, the heat medium in the buffer tank 110 of the first equipment 100 is supplied to the buffer tank 210 of the second equipment 200, or the supply of the heat medium is prohibited.

The third path L3 is a pipe that connects the buffer tank 210 of the second equipment 200 to a connection point A of the first path L1. The connection point A is located on a downstream side (consumer side equipment 300 side) of the intermediate position described above. The heat medium in the buffer tank 210 of the second equipment 200 can be supplied to the hot water storage tank 310 of each of the plurality of consumer side equipment 300 through the third path L3 and the first path L1.

The fourth path L4 is a pipe that connects the hot water storage tank 310 of each of the plurality of consumer side equipment 300 to the buffer tank 110 of the first equipment 100. Therefore, the heat medium whose temperature has been lowered by the heating of the water in each hot water storage tank 310 flows into the fourth path L4. The fourth path L4 merges into one path at a connection point B and is connected to the buffer tank 110.

The differential pressure measurement unit 400 detects a differential pressure between the first path L1 (downstream side of the connection point A) and the fourth path L4 (downstream side of the connection point B). When a temperature of water in the hot water storage tank 310 is decreased, the opening degree of the two-way valve 330 is increased. As a result, the differential pressure between the first path L1 and the fourth path L4 is reduced. Therefore, it can be said that the differential pressure measurement unit 400 detects the opening degree of each two-way valve 330 alternatively by measuring the differential pressure. The circulation pump P serves as a power source for circulating the heat medium between the first equipment 100 and the consumer side equipment 300 and between the second equipment 200 and the consumer side equipment 300. A rotation speed of the circulation pump P is controlled based on the differential pressure measured by the differential pressure measurement unit 400. That is, when the differential pressure is decreased, the rotation speed of the circulation pump P is increased, and a circulation amount of the heat medium is increased. As a result, when the opening degree of the two-way valve 330 is increased, the circulation amount of the heat medium is increased, and the temperature of the water in the hot water storage tank 310 is increased.

A first temperature sensor T1 detects a temperature of the heat medium on an upstream side of the motor operated valve SV in the first path L1. A second temperature sensor T2 detects the temperature of the heat medium on the downstream side of the connection point A in the first path L1. A controller (not shown) controls the motor operated valve SV based on signals of the first temperature sensor T1 and the second temperature sensor T2. For example, when the temperature (temperature detected by the first temperature sensor T1) of the heat medium in the buffer tank 110 of the first equipment 100 is sufficiently high, the controller controls the motor operated valve SV to supply the heat medium from the buffer tank 110 of the first equipment 100 to the hot water storage tanks 310 of the plurality of consumer side equipment 300 without passing through the buffer tank 210 of the second equipment 200. On the other hand, when the temperature of the heat medium in the buffer tank 110 of the first equipment 100 is not sufficiently high, the controller controls the motor operated valve SV to supply the heat medium from the buffer tank 110 of the first equipment 100 to the buffer tank 210 of the second equipment 200. The heat medium is heated to an appropriate temperature (confirmed by the temperature detected by the second temperature sensor T2) by passing through the buffer tank 210 of the second equipment 200, and is supplied to the hot water storage tanks 310 of the plurality of consumer side equipment 300. Alternatively, the control can be used to adjust the opening degree so that a value of the second temperature sensor T2 reaches a predetermined target temperature set in advance.

In such a cogeneration system CS, the circulation pump P is driven at a small rotation speed even when no hot water is used, so that the temperature of the plurality of hot water storage tanks 310 is maintained at a predetermined temperature. In this state, when the hot water is used by each consumer, the temperature of hot water in the hot water storage tank 310 is decreased. As a result, the opening degree of the two-way valve 330 of the consumer is increased, and the differential pressure measured by the differential pressure measurement unit 400 is decreased. As a result, the rotation speed of the circulation pump P is increased.

Here, when the temperature of the heat medium detected by the first temperature sensor T1 is sufficiently high, the heat medium in the buffer tank 210 of the second equipment 200 is not used, and the heat medium in the buffer tank 110 of the first equipment 100 is supplied to the hot water storage tanks 310 of the plurality of consumer side equipment 300. On the other hand, when the temperature of the heat medium detected by the first temperature sensor T1 is not sufficiently high, the motor operated valve SV is controlled, and the heat medium in the buffer tank 110 of the first equipment 100 is supplied to the buffer tank 210 of the second equipment 200. Then, the heat medium heated to an appropriate temperature (confirmed by the temperature detected by the second temperature sensor T2) in the buffer tank 210 of the second equipment 200 is supplied to the hot water storage tanks 310 of the plurality of consumer side equipment 300.

Here, since the cogeneration system CS as described above is required to have high power generation efficiency and high waste heat utilization efficiency, it is preferable that the cogeneration equipment C is subjected to a base load operation at a full load of, for example, 24 hours and 365 days, and it is preferable that waste heat is used well. In particular, the waste heat is preferably used without being wasted by the radiator R. For this reason, it is conceivable to increase a capacity of each hot water storage tank 310 so as to avoid wasting the heat, but in this case, the capacity is not appropriate for the cogeneration equipment C, resulting in a decrease in efficiency of an entire system.

Figure 3:
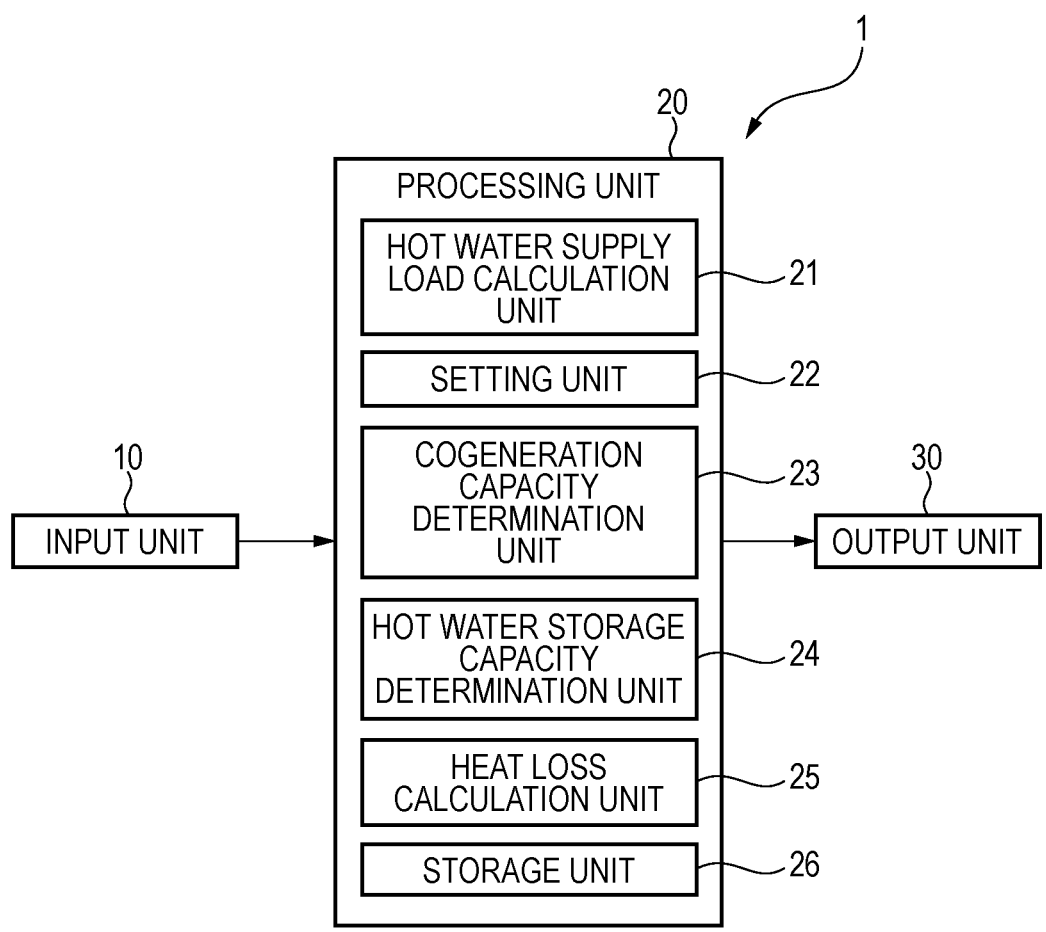
FIG. 3 is a block diagram showing an equipment determination device according to the present embodiment.

Therefore, an equipment determination device according to the present embodiment is proposed. FIG. 3 is a block diagram showing the equipment determination device according to the present embodiment. An equipment determination device 1 shown in FIG. 3 is a device configured to appropriately determine a size of the cogeneration equipment C and the capacity of the hot water storage tank 310 according to environment. Such an equipment determination device 1 includes an input unit 10, a processing unit 20, and an output unit 30.

The input unit 10 includes an operation unit or the like operated by a user who uses the equipment determination device 1. Various conditions, an initial value, and the like are input to the input unit 10. The processing unit 20 functions by executing an equipment determination program, and includes a hot water supply load calculation unit 21, a setting unit 22, a cogeneration capacity determination unit 23, a hot water storage capacity determination unit 24, and a storage unit 26. The equipment determination program may be stored in the storage unit 26 in advance, or may be a program recorded in a recording medium such as a USB memory or a CD-ROM and newly downloaded and stored in the storage unit 26. Further, the equipment determination program may be downloaded through a network and stored in the storage unit 26.

The output unit 30 outputs determination results from the cogeneration capacity determining unit 23 and the hot water storage capacity determination unit 24 to the user, and includes, for example, a display device such as a display or a printing machine for a paper medium such as a printer. In addition, the output unit 30 may include a communication unit that outputs a result by e-mail or the like.

The hot water supply load calculation unit 21 calculates, based on each unit hot water supply load for 24 hours (an example of two or more divided periods) according to hot water use by a plurality of consumers, a total hot water supply load for each day (an example of a specific period including the two or more divided periods) over one year (an example of a predetermined period longer than the specific period).

Here, each unit hot water supply load for 24 hours (that is, transition of the hot water supply load for one day) is stored in the storage unit 26 in advance. In addition, each unit hot water supply load for 24 hours is stored separately for each category such as a live-alone, a live with two people, and a family of four. Further, the storage unit 26 also stores information on a change in water supply temperature for 365 days, each month, or each season, and information on a change in the water supply temperature in an area.

For example, as shown in FIG. 1, when the cogeneration system CS is applied to a 6-unit condominium (for a single person), the hot water supply load calculation unit 21 reads information on each unit hot water supply load for 24 hours for a live-alone from the storage unit 26, and multiplies the information by six. Next, the hot water supply load calculation unit 21 calculates the total hot water supply load for each day over one year in consideration of the information on a change in the water supply temperature for 365 days, each month, or each season and the information on a change in the water supply temperature in an area.

Figure 4:
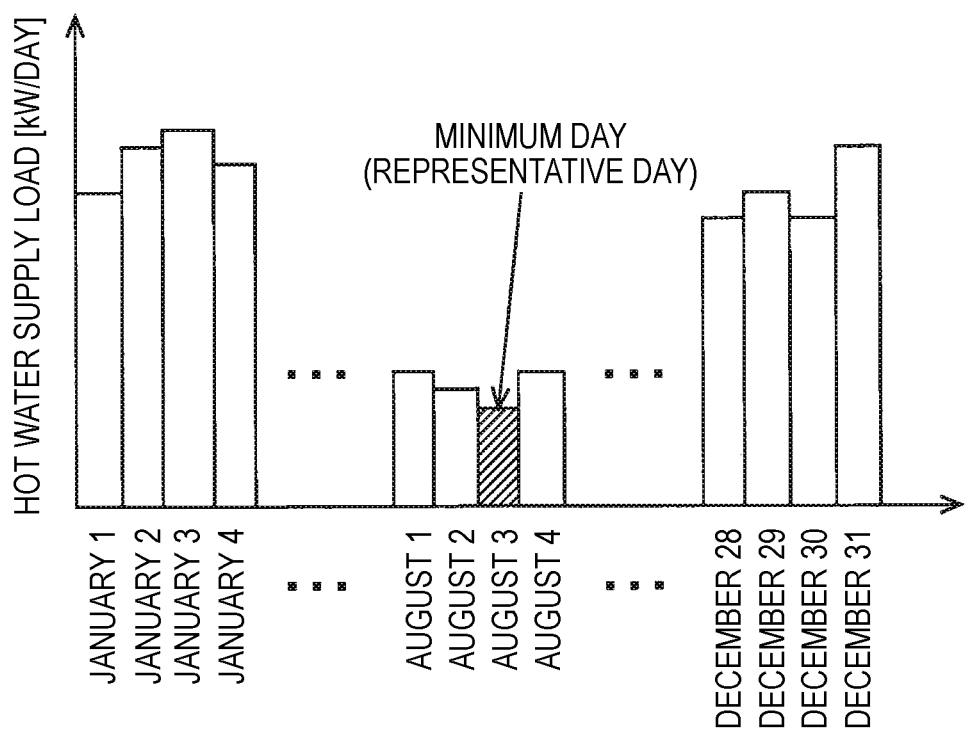
FIG. 4 is a diagram showing an example of a total hot water supply load for each day calculated by a hot water supply load calculation unit shown in FIG. 3 over one year.

FIG. 4 is a diagram showing an example of the total hot water supply load for each day calculated by the hot water supply load calculation unit 21 shown in FIG. 3 over one year. As shown in FIG. 4, for example, each total hot water supply load for 365 days is calculated by adding up the information on the hot water supply load of each unit. In particular, by considering the information on a change in the water supply temperature, the total hot water supply load for each day is calculated reflecting the fact that, for example, in winter, when the water supply temperature is low, an use amount of hot water in the hot water storage tank 310 is increased so as to supply hot water of a set temperature (for example, 42° C.) to the consumer, thus increasing the hot water load.

FIG. 3 is referred to again. The setting unit 22 sets, as a representative day (an example of a representative period), a minimum day on which the total hot water supply load is minimum (an example of a specific period on which the total hot water supply load is at least on a low load side) among the total hot water supply load for each day calculated by the hot water supply load calculation unit 21. The setting unit 22 is not limited to setting the minimum day as the representative day, may set, for example, a second lowest day, as long as the day is any day on which the total hot water supply load is on at least the low load side (low load side when the total hot water supply load is divided into a low load side and a high load side) in one year.

The cogeneration capacity determination unit 23 determines the capacity of the cogeneration equipment based on the total hot water supply load on the representative day set by the setting unit 22. At this time, the cogeneration capacity determination unit 23 calculates an average value (representative value) of the unit hot water supply loads from the unit hot water supply loads for the specific period constituting the representative day, and determines the capacity of the cogeneration equipment C.

Figure 5:
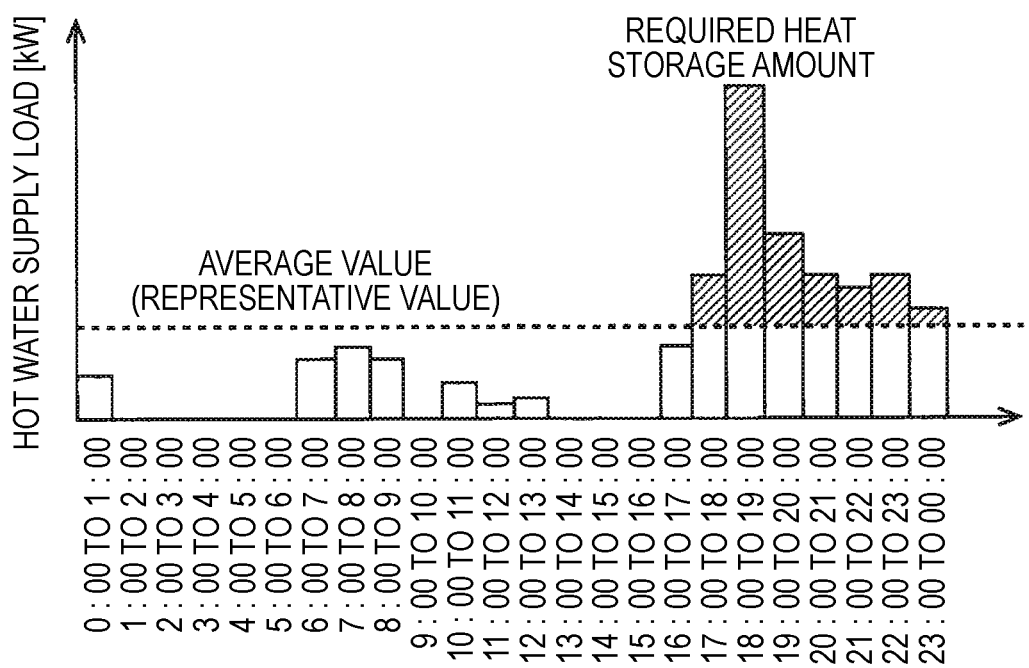
FIG. 5 is a diagram showing an example of a unit hot water supply load for each hour on a representative day shown in FIG. 4.

FIG. 5 is a diagram showing an example of the unit hot water supply load for each hour on the representative day shown in FIG. 4. As shown in FIG. 5, on the representative day, for example, there is a slight hot water supply load in morning and daytime, and after that, the hot water supply load is the highest in night and becomes the maximum in 18:00 to 19:00. The cogeneration capacity determination unit 23 calculates an average value from such a unit hot water supply load, and determines the capacity of the cogeneration equipment C based on the average value.

In this case, the cogeneration capacity determination unit 23 selects the cogeneration equipment C having a capacity close to the average value. Specifically, the cogeneration equipment C does not have numerous capacities, and the capacities are determined step-wise. The cogeneration capacity determination unit 23 determines the capacity of the cogeneration equipment C by selecting a capacity close to the average value from such stepwise capacities. This is because, theoretically, on the representative day, even when the cogeneration equipment C is used while storing heat in the hot water storage tank 310 in the full load operation of a base load, the waste heat can be used without being substantially wasted.

In particular, the cogeneration capacity determination unit 23 preferably selects the capacity of the cogeneration equipment C so that the capacity is smaller than the average value. This is because the smaller the capacity of the cogeneration equipment C, the smaller the possibility of wasting waste heat even when the full load operation of a base load is performed on the cogeneration equipment C, and the better the thermal efficiency.

FIG. 3 will be referred to again. The hot water storage capacity determination unit 24 determines a total capacity of the plurality of hot water storage tanks 310 based on an amount of hot water supply load exceeding the capacity of the cogeneration equipment C determined by the cogeneration capacity determination unit 23 among the unit hot water supply load for each hour. In principle, it is necessary to secure a heat amount in the plurality of hot water storage tanks 310 so as to cope with the hot water supply load exceeding the capacity of the cogeneration equipment C. Therefore, it is preferable to determine the plurality of hot water storage tanks 310 with a total capacity corresponding to such a hot water supply load. For example, when the capacity of the cogeneration equipment C is determined to be the average value from the unit hot water supply load, the hot water storage capacity determination unit 24 determines the amount of hot water supply load exceeding the capacity of the cogeneration equipment C shown in FIG. 5 (hatched portion) as the total capacity of the plurality of hot water storage tanks 310.

In this case, for the plurality of hot water storage tanks 310, the total capacity capable of securing the heat amount is determined based on, for example, a predetermined hot water supply design temperature (for example, 65° C.).

After determining the total capacity of the plurality of hot water storage tanks 310, the hot water storage capacity determination unit 24 also determines the capacity of the individual hot water storage tank 310. In this case, the hot water storage capacity determination unit 24 may determine each capacity by, for example, equally dividing the total capacity by the number of units, or may determine each capacity by performing weighting for each category such as a live-alone or a family of four.

As described above, the equipment determination device 1 according to the present embodiment determines the capacity of the cogeneration equipment C and the total capacity of the plurality of hot water storage tanks 310 (the capacity of the individual hot water storage tanks 310). In particular, since the capacity of the cogeneration equipment C is determined based on the minimum day on which the hot water supply load is minimized, the possibility of waste heat being wasted is reduced even when the full load operation of a base load is performed on the cogeneration equipment C.

In addition, since the capacity of the plurality of hot water storage tanks 310 is determined based on the hot water supply load exceeding the capacity of the cogeneration equipment C, the capacity of the plurality of hot water storage tanks 310 is set to cope with an amount of transient load in which the hot water supply load is increased on the representative day, and the capacity of the hot water storage tank 310 is optimized.

In the above description, a size of the buffer tank 110 may be determined in accordance with, for example, the capacity of the cogeneration equipment C, and the buffer tank 110 may have such a size that the heat exchange between the waste heat and the heat medium is smoothly performed. Further, similarly, the buffer tank 210 may have a size which is determined according to the boiler BO and that the heat exchange between the waste heat and the heat medium is smoothly performed. In addition, the buffer tank 110 includes the heat exchanger 130 inside, but the present invention is not limited thereto, and the buffer tank 110 may include the heat exchanger 130 outside similarly to the heat exchanger HE. Similarly, the buffer tank 210 has the heat exchanger HE outside, but the present invention is not limited thereto, and the buffer tank 210 may have the heat exchanger HE inside similarly to the heat exchanger 130.

Further, the processing unit 20 includes a heat loss calculation unit 25. The heat loss calculation unit 25 calculates an amount of heat loss in the buffer tank 110, the plurality of hot water storage tanks 310 having the determined total capacity, and the supply path L. The heat medium dissipates heat depending on a size of a surface area of the buffer tank 110 and the supply path L. In addition, the hot water in the plurality of hot water storage tanks 310 also dissipates heat according to a surface area of the plurality of hot water storage tanks 310. Therefore, the heat loss calculation unit 25 calculates such a heat loss. The heat loss calculation unit 25 may assume that an outside air temperature or an underground temperature is a constant value when calculating the heat loss, but the present invention is not limited thereto, and a change in the outside air temperature or the underground temperature (particularly, a change in the underground temperature is very small) may be considered.

The cogeneration capacity determination unit 23 re-determines the capacity of the cogeneration equipment C in consideration of a calculation result by the heat loss calculation unit 25. The cogeneration capacity determination unit 23 determines the capacity of the cogeneration equipment C based on the total hot water supply load obtained by adding a load corresponding to the amount of heat loss on the representative day calculated by the heat loss calculation unit 25 to the total hot water supply load on the representative day calculated last time.

Figure 6:
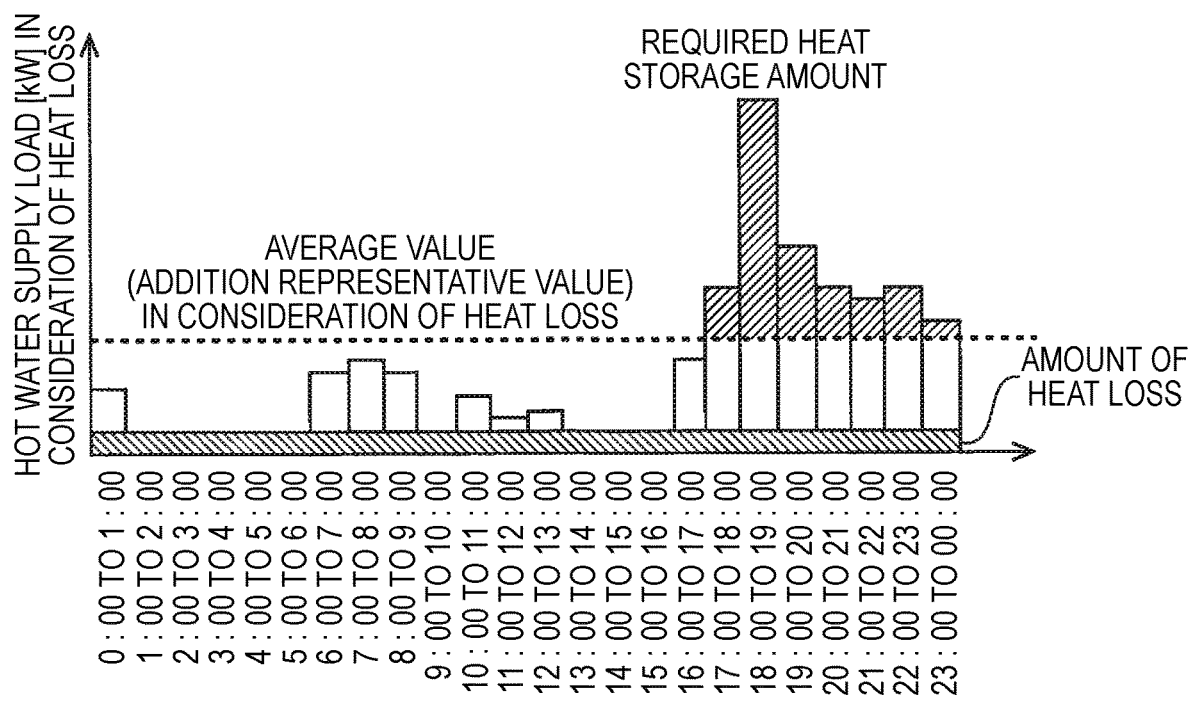
FIG. 6 is a diagram showing an example of a unit hot water supply load for each hour on a representative day in consideration of heat loss.

FIG. 6 is a diagram showing an example of the unit hot water supply load for each hour on the representative day in consideration of the heat loss. As shown in FIG. 6, the cogeneration capacity determination unit 23 calculates an average value from the unit hot water supply load obtained by adding a load corresponding to the amount of heat loss for each hour to each unit hot water supply load for, for example, each hour, and re-determines the capacity of the cogeneration equipment C based on the average value. At this time, the cogeneration capacity determination unit 23 re-determines the cogeneration equipment C to have a capacity as close to the average value as possible and equal to or less than the average value, as described above. The value to be calculated is not limited to the average value.

The hot water storage capacity determination unit 24 re-determines the capacity (total capacity) of the plurality of hot water storage tanks 310 based on the amount of hot water supply load exceeding the capacity of the cogeneration equipment C determined last time among the unit hot water supply load obtained by adding the load corresponding to the amount of heat loss for each hour to each unit hot water supply load for each hour. Here, as shown in FIG. 6, when the capacity of the cogeneration equipment C is determined to be the average value from the unit hot water supply load, the hot water storage capacity determination unit 24 re-determines the amount of hot water supply load exceeding the capacity of the cogeneration equipment C shown in FIG. 6 (hatched portion) as the total capacity of the plurality of hot water storage tanks 310.

After re-determining the total capacity of the plurality of hot water storage tanks 310, the hot water storage capacity determination unit 24 also determines the capacity of the individual hot water storage tank 310 in the same manner as described above.

In order to execute the process described above, when a difference between the capacity of the plurality of hot water storage tanks 310 determined this time and the capacity of the plurality of hot water storage tanks 310 determined last time falls within a predetermined range, the equipment determination device 1 adopts the capacity of the plurality of hot water storage tanks 310 determined this time as a final result.

On the other hand, when the difference between the capacity of the plurality of hot water storage tanks 310 determined this time and the capacity of the plurality of hot water storage tanks 310 determined last time does not fall within the predetermined range, the equipment determination device 1 executes again a process by the heat loss calculation unit 25, a determination process by the cogeneration capacity determination unit 23, and a determination process by the hot water storage capacity determination unit 24.

Figure 7:
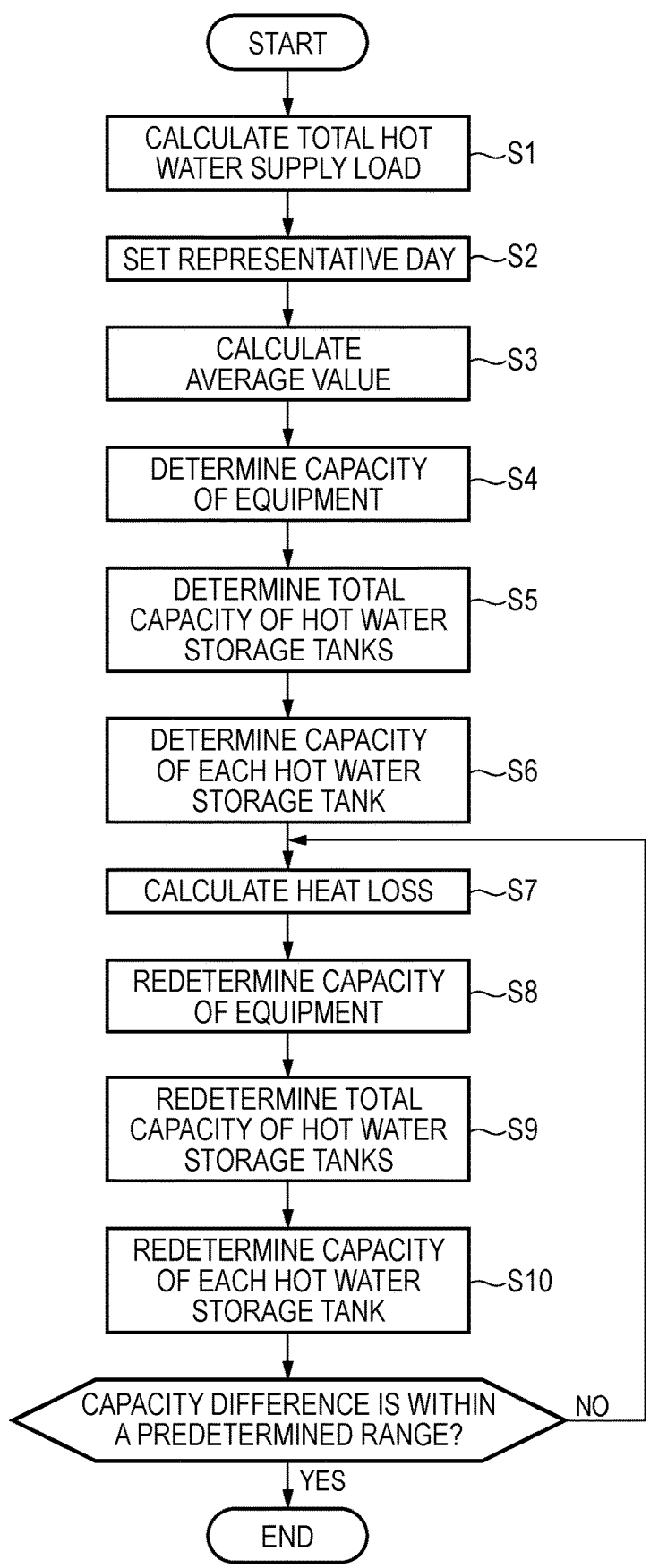
FIG. 7 is a flowchart showing an equipment determination method of a cogeneration system according to the embodiment of the present invention.

FIG. 7 is a flowchart showing an equipment determination method of the cogeneration system CS according to the embodiment of the present invention. First, as shown in FIG. 7, the hot water supply load calculation unit 21 calculates the total hot water supply load for each day including the unit hot water supply load for each hour over one year (S1). In this process, the hot water supply load calculation unit 21 calculates the total hot water supply load based on hot water supply load data for a live-alone and a family, and the like stored in the storage unit 26 in advance.

Next, the setting unit 22 sets the representative day (S2). In this process, the setting unit 22 sets a day on which the total hot water supply load of one day is minimum as the representative day. The representative day is not limited to the day on which the total hot water supply load of one day is minimum. When the total hot water supply load of one day is divided into a low load side and a high load side in one year, any days belonging to the low load side may be selected as the representative day.

Next, the cogeneration capacity determination unit 23 calculates an average value of the unit hot water supply load for each hour on the representative day (S3). The cogeneration capacity determination unit 23 is not limited to calculating the average value, and may adopt an average value or a median value excluding a minimum value and a maximum value.

Next, the cogeneration capacity determination unit 23 determines the capacity of the cogeneration equipment C based on the average value calculated in step S3 (S4). In this process, the cogeneration capacity determination unit 23 selects the cogeneration equipment C whose capacity is closest to the average value, or the cogeneration equipment C whose capacity is closest to the average value or less from the cogeneration equipment C whose capacity is determined stepwise.

Thereafter, the hot water storage capacity determination unit 24 determines the total capacity of the plurality of hot water storage tanks 310 based on the capacity of the cogeneration equipment C determined in step S4 (S5). In this case, the hot water storage capacity determination unit 24 determines the total capacity of the plurality of hot water storage tanks 310 based on the amount of hot water supply load exceeding the capacity of the cogeneration equipment C as shown in FIG. 5. That is, the total capacity of the plurality of hot water storage tanks 310 is determined so as to cope with the hot water supply load exceeding the capacity of the cogeneration equipment C.

Next, the hot water storage capacity determination unit 24 determines the capacity of each hot water storage tank 310 based on the total capacity of the plurality of hot water storage tanks 310 determined in step S5 (S6). In this process, the hot water storage capacity determination unit 24 may determine the capacity of each hot water storage tank 310 by simply equally dividing the total capacity by the number of households or the like, or may prorate the total capacity in consideration of a live-alone household, a family household of four, or the like.

Thereafter, the heat loss calculation unit 25 calculates the amount of heat loss on the representative day in the buffer tank 110, each hot water storage tank 310 determined in step S6, and the supply path L (S7). That is, the heat loss calculation unit 25 calculates an amount of heat dissipation from the buffer tank 110, each hot water storage tank 310 determined in step S6, and the supply path L.

Next, the cogeneration capacity determination unit 23 determines the capacity of the cogeneration equipment C based on the total hot water supply load obtained by adding the load corresponding to the amount of heat loss on the representative day calculated in step S7 to the total hot water supply load on the representative day calculated in step S1 (S8). That is, the cogeneration capacity determination unit 23 re-determines the capacity of the cogeneration equipment C as shown in FIG. 6. In this process, similarly to step S4, it is preferable that the capacity is determined to be close to the average value and equal to or less than the average value.

Thereafter, the hot water storage capacity determination unit 24 re-determines the total capacity of the plurality of hot water storage tanks 310 based on the capacity of the cogeneration equipment C determined in step S8 (S9). In this process, the hot water storage capacity determination unit 24 re-determines the total capacity of the plurality of hot water storage tanks 310 in the same manner as in step S5.

Next, the hot water storage capacity determination unit 24 re-determines the capacity of each hot water storage tank 310 based on the total capacity of the plurality of hot water storage tanks 310 determined in step S9 (S10). In this process, the hot water storage capacity determination unit 24 re-determines the capacity of each hot water storage tank 310 in the same manner as in step S6.

Thereafter, the processing unit 20 determines whether a capacity difference between the total capacity of the plurality of hot water storage tanks 310 determined last time (for example, the total capacity of the plurality of hot water storage tanks 310 determined in step S5) and the total capacity of the plurality of hot water storage tanks 310 determined this time (for example, the total capacity of the plurality of hot water storage tanks 310 determined in step S9) is within a predetermined range (for example, x %) (S11).

When the capacity difference is not within the predetermined range (S11: NO), the process proceeds to step S7. Therefore, the processing unit 20 executes the process by the heat loss calculation unit 25 (second time), the determination process by the cogeneration capacity determination unit 23 (third time), and the determination process by the hot water storage capacity determination unit 24 (third time). After the execution, when the capacity difference does not fall within the predetermined range, the process by the heat loss calculation unit 25 (third and subsequent times), the determination process by the cogeneration capacity determination unit 23 (fourth and subsequent times), and the determination process by the hot water storage capacity determination unit 24 (fourth and subsequent times) are executed again.

When the capacity difference is within the predetermined range (S11: YES), the processing unit sets the capacity of the cogeneration equipment C determined in the latest processing of steps S8 to S10 to be repeatedly executed and the total capacity of the plurality of hot water storage tanks 310 (the capacity of each hot water storage tank 310) as a final result.

As described above, according to the equipment determination method of the cogeneration system CS, the equipment determination device 1 thereof, and the computer readable recording medium thereof of the present embodiment, the day on which the total hot water supply load for each day is minimized is set as the representative day, and the capacity of the cogeneration equipment C is determined based on the total hot water supply load on the set representative day, so that the amount of wasted heat is small even when the cogeneration equipment C is used while storing heat in the hot water storage tank 310 in the base load operation at a full load. In addition, since the capacities of the plurality of hot water storage tanks 310 are determined based on the amount of the hot water supply load exceeding the capacity of the cogeneration equipment C, the capacity sufficient to cover the transient load at which the hot water supply load is increased on the representative day is set in the plurality of hot water storage tanks 310, and the capacity of the hot water storage tanks 310 is optimized. Therefore, it is possible to prevent a decrease in the efficiency of the entire system.

In addition, by determining more appropriate capacity of the cogeneration equipment C and the plurality of hot water storage tanks 310 in consideration of the heat loss, it is possible to further prevent a decrease in the efficiency of the entire system.

In addition, since the final result is obtained when the difference between the capacity of the plurality of hot water storage tanks 310 determined this time and the capacity of the plurality of hot water storage tanks 310 determined last time falls within the predetermined range, the capacity of the cogeneration equipment C and the capacity of the plurality of hot water storage tanks 310 are repeatedly executed when the difference falls outside the predetermined range, the difference between the capacity at this time and the capacity at last time is small, it is possible to determine a more appropriate capacity of the cogeneration equipment C and the plurality of hot water storage tanks 310 in a state where the calculation variation is prevented, and it is possible to further prevent a decrease in the efficiency of the entire system.

Although the present invention has been described above based on the embodiments, the present invention is not limited to the above embodiments, and various modifications may be made without departing from the spirit of the present invention and publicly-known or well-known techniques may be appropriately combined within a possible range.

For example, in the present embodiment, the hot water supply load calculation unit 21 calculates the total hot water supply load for one day over one year based on the unit hot water supply load for one hour unit, but the present invention is not limited thereto. For example, the total hot water supply load for one month may be calculated over one year based on the unit hot water supply load for three hour units, the total hot water supply load for one week (or one month) may be calculated over ten years based on the unit hot water supply load for one day unit, and each period may be appropriately set according to an application state of the cogeneration system CS. In this case, the setting unit 22 may set a representative week, a representative month, or the like instead of the representative day.

What is claimed is:

1. An equipment determination method of a cogeneration system, the cogeneration system including:
    a cogeneration equipment configured to generate electric power and discharge heat;
    a heater configured to heat water using waste heat from the cogeneration equipment;
    a plurality of hot water storage tanks configured to be provided for a plurality of consumers; and
    a supply path configured to supply a heat medium heated by the heater to the plurality of hot water storage tanks,
the equipment determination method comprising:
    a hot water supply load calculation step of calculating, based on each unit hot water supply load for two or more divided periods according to hot water supply use by the plurality of consumers, a total hot water supply load for each specific period including the two or more divided periods over a predetermined period longer than the specific period;
    a setting step of setting, as a representative period, a specific period on which the total hot water supply load is at least on a low load side of the total hot water supply load for each specific period calculated in the hot water supply load calculation step;
    a first cogeneration capacity determination step of determining a capacity of the cogeneration equipment based on the total hot water supply load on the representative period set in the setting step; and
    a first hot water storage capacity determination step of determining a capacity of the plurality of hot water storage tanks based on an amount of hot water supply load exceeding the capacity of the cogeneration equipment determined in the first cogeneration capacity determination step among each unit hot water supply load for the two or more divided periods including the representative period set in the setting step.

2. The equipment determination method of the cogeneration system according to claim 1, further comprising:
    an n-th heat loss calculation step of calculating an amount of heat loss in a buffer tank provided with the heater, the plurality of hot water storage tanks having the capacity determined in an n-th (n is a natural number) hot water storage capacity determination step, and the supply path;
    an (n+1)-th cogeneration capacity determination step of determining the capacity of the cogeneration equipment based on a total hot water supply load obtained by adding a load corresponding to the amount of heat loss on the representative period calculated in the n-th heat loss calculation step to the total hot water supply load on the representative period calculated in the hot water supply load calculation step; and
    an (n+1)-th hot water storage capacity determination step of determining the capacity of the plurality of hot water storage tanks based on the amount of hot water supply load exceeding the capacity of the cogeneration equipment determined in the (n+1)-th cogeneration capacity determination step among the unit hot water supply load obtained by adding a load corresponding to each amount of heat loss for the two or more divided periods calculated in the n-th heat loss calculation step to each unit hot water supply load for two or more divided periods constituting the representative period set in the setting step.

3. The equipment determination method of the cogeneration system according to claim 2,
    wherein when a difference between the capacity of the plurality of hot water storage tanks determined in the (n+1)-th hot water storage capacity determination step and the capacity of the plurality of hot water storage tanks determined in the n-th hot water storage capacity determination step falls within a predetermined range, the capacity of the plurality of hot water storage tanks determined in the (n+1)-th hot water storage capacity determination step is adopted as a final result, and
    wherein when the difference between the capacity of the plurality of hot water storage tanks determined in the (n+1)-th hot water storage capacity determination step and the capacity of the plurality of hot water storage tanks determined in the n-th hot water storage capacity determination step does not fall within a predetermined range,
    an (n+1)-th heat loss calculation step of calculating the amount of heat loss in the buffer tank, the plurality of hot water storage tanks having the capacity determined in the (n+1)-th hot water storage capacity determination step, and the supply path;
    an (n+2)-th cogeneration capacity determination step of determining the capacity of the cogeneration equipment based on a total hot water supply load obtained by adding a load corresponding to the amount of heat loss on the representative period calculated in the (n+1)-th heat loss calculation step to the total hot water supply load on the representative period calculated in the hot water supply load calculation step; and
    an (n+2)-th hot water storage capacity determination step of determining the capacity of the plurality of hot water storage tanks based on the amount of hot water supply load exceeding the capacity of the cogeneration equipment determined in the (n+2)-th cogeneration capacity determination step among the unit hot water supply load obtained by adding a load corresponding to each amount of heat loss for the two or more divided periods calculated in the (n+1)-th heat loss calculation step to each unit hot water supply load for the two or more divided periods constituting the representative period set in the setting step are executed.

4. A computer readable recording medium that records an equipment determination program for causing a computer to execute the equipment determination method according to claim 3.

5. A computer readable recording medium that records an equipment determination program for causing a computer to execute the equipment determination method according to claim 2.

6. A computer readable recording medium that records an equipment determination program for causing a computer to execute the equipment determination method according to claim 1.

7. An equipment determination device of a cogeneration system, the cogeneration system including:
- a cogeneration equipment configured to generate electric power and discharge heat,
- a heater configured to heat water using waste heat from the cogeneration equipment;
- a plurality of hot water storage tanks configured to be provided for a plurality of consumers; and
- a supply path configured to supply water heated by the heater to the plurality of hot water storage tanks, the equipment determination device comprising:
- a hot water supply load calculation unit configured to calculate, based on each unit hot water supply load for two or more divided periods according to hot water supply use by the plurality of consumers, a total hot water supply load for each specific period including the two or more divided periods over a predetermined period longer than the specific period;
- a setting unit configured to set, as a representative period, a specific period on which the total hot water supply load is at least on a low load side of the total hot water supply load for each specific period calculated by the hot water supply load calculation unit;
- a cogeneration capacity determination unit configured to determine a capacity of the cogeneration equipment based on the total hot water supply load on the representative period set by the setting unit; and
- a hot water storage capacity determination unit configured to determine a capacity of the plurality of hot water storage tanks based on an amount of hot water supply load exceeding the capacity of the cogeneration equipment determined by the cogeneration capacity determination unit among each unit hot water supply load for the two or more divided periods constituting the representative period set by the setting unit.

* * * * *